Sept. 24, 1929.  H. M. OCKO  1,729,451
STATION INDICATOR
Filed Oct. 5, 1927  9 Sheets-Sheet 4

Inventor
Harry M. Ocko
By his Attorney

Sept. 24, 1929.  H. M. OCKO  1,729,451
STATION INDICATOR
Filed Oct. 5, 1927  9 Sheets-Sheet 5

Inventor
Harry M. Ocko
By his Attorney

Sept. 24, 1929.   H. M. OCKO   1,729,451
STATION INDICATOR
Filed Oct. 5, 1927   9 Sheets-Sheet 7
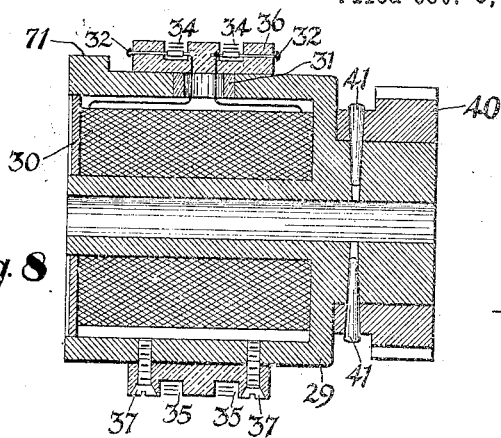
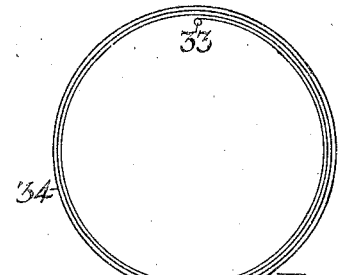
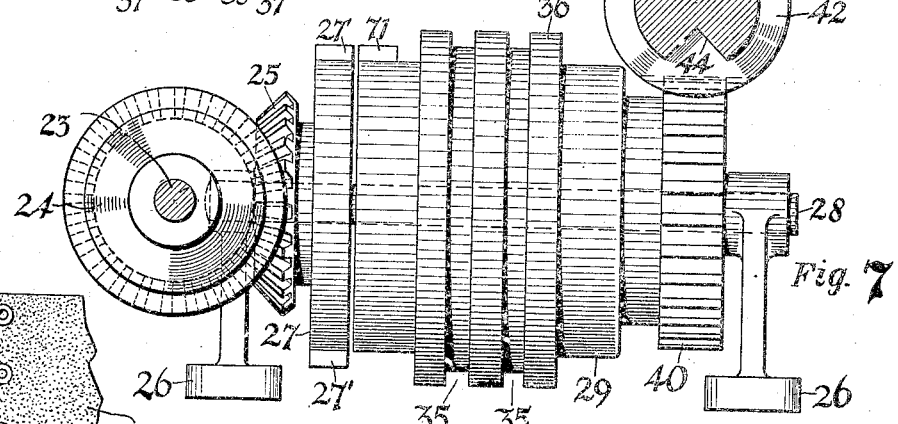
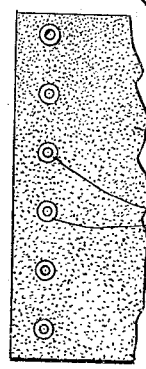
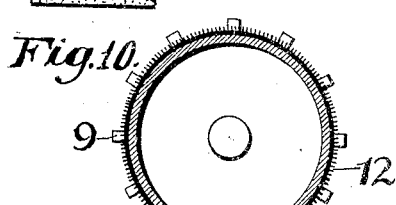
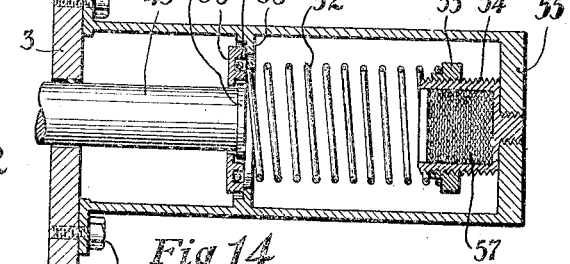
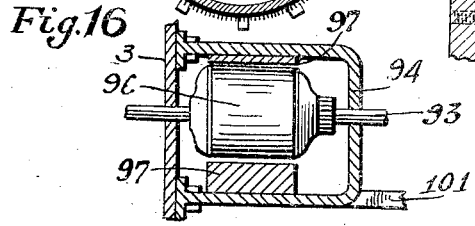
Inventor
Harry M. Ocko
By his Attorney

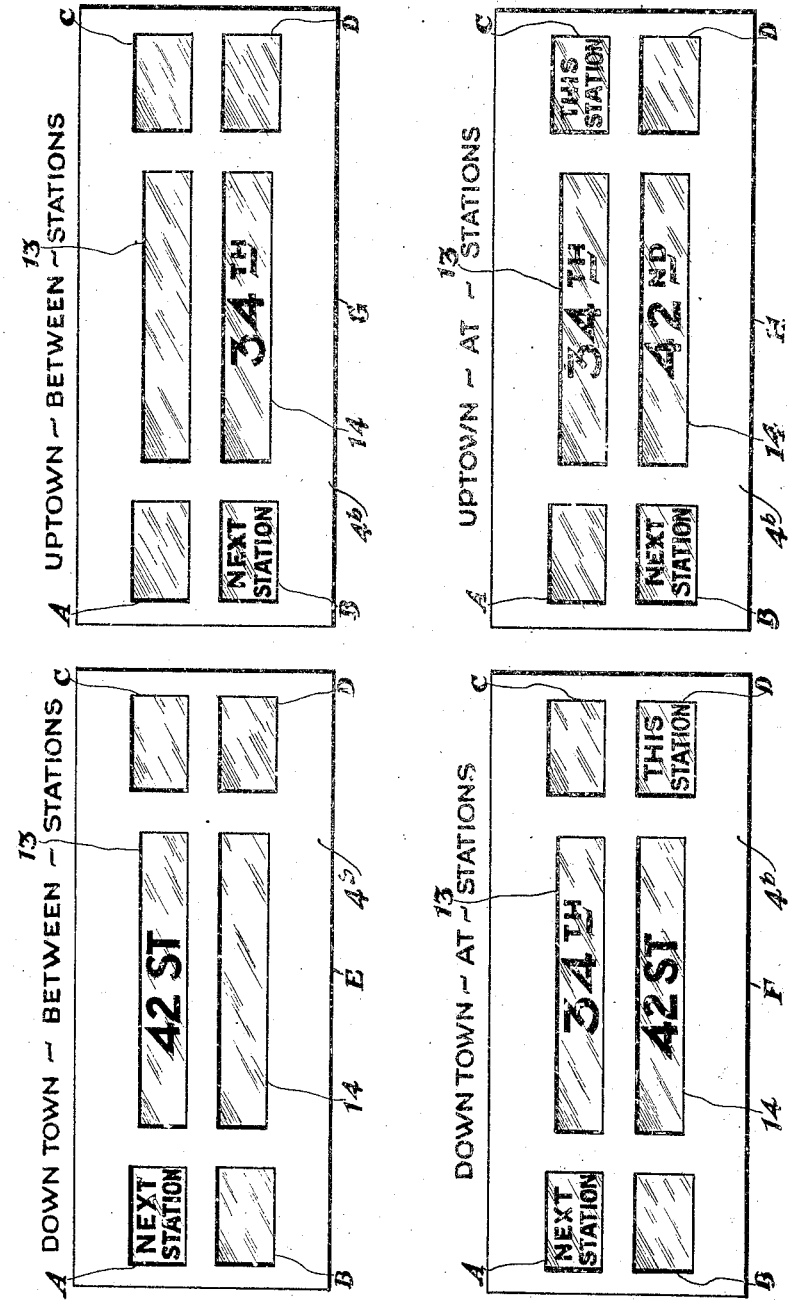

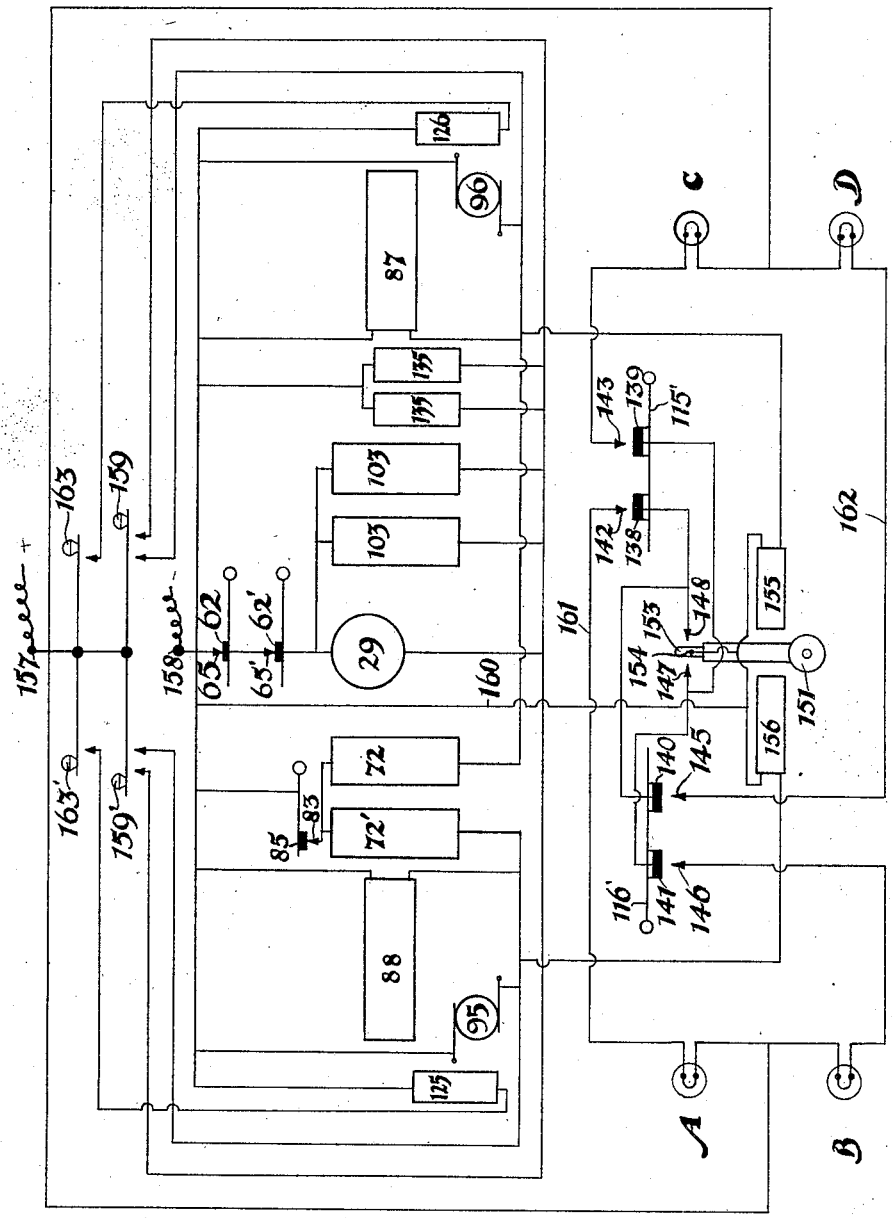

Patented Sept. 24, 1929

1,729,451

UNITED STATES PATENT OFFICE

HARRY M. OCKO, OF MONSEY, NEW YORK

STATION INDICATOR

Application filed October 5, 1927. Serial No. 224,031.

This invention relates to station indicators and particularly of a class being electrically operated and more particularly electro-magnetically operated for moving a curtain or web, having thereon the names of the streets or stations along the route, a predetermined distance as each station is approached, by means of particularly novel mechanism of such design and construction as will permit of successful operations under the detrimental operating conditions of railway service.

The successful results as here referred to are accomplished by providing individual motive power for each movement, said motive power being brought into and out of action automatically by the conductor or motorman pushing a button. As it is necessary in many instances, particularly on trains to operate many indicators on one circuit, same being of given current strength, all the indicators on said circuit would have to be of the same frictional resistance (requiring construction which would be commercially impractical) and if this be not true, such machines which have greater frictional resistance would not complete the required web movement, while those indicators having lower resistance, would make too rapid movement. By the individual power movement each unit is capable of the finest adjustment, permitting machines to be manufactured commercially with the operating precision of the finest instruments. This, however, would be impossible in a single source of power method, which would require a multiplicity of parts, each contributing frictional resistance, incapable of proper adjustment.

The object of the invention is to enable passengers in a street or railway car to know the station being approached. A further object of the invention is to enable passengers to know the name of the station at which the car or train is at rest, thereby informing such passengers as may have failed to take previous notice, which is commonly the case when passengers are engaged in conversation or occupied in reading, but recalled of their destination when the doors are opened.

In carrying out my invention I employ two pairs of rolls, one pair which I shall call the supply rolls being rearwardly mounted in a suitable frame or casing, for the purpose of winding or unwinding, depending upon the direction in which the train is moving, a curtain or web upon which are inscribed the names of the streets or stations along the route, said rolls being rotated by a small motor on the shaft of each. On said shaft is secured a friction disc above which is pivotally mounted on a bracket, a brake shoe, said brake shoe being kept in contact with the periphery of said disc by a spring, said brake shoe being released by an electro-magnet during periods when the previously mentioned supply rolls are in motion. The purpose of this magnetic brake is to prevent the rolls from unwinding during the jolting and swaying of the car, also to bring the rolls to a quick stop when the web has been moved to a new station position, thereby preventing overrunning of said web as will be better understood as the description progresses.

The other pair of rolls which I shall call the web actuating rolls are forwardly mounted in the previously mentioned frame or casing being provided with outwardly projecting pegs or teeth coacting with perforations in the previously mentioned web, said rolls being further provided with a friction surface, thereby affording good gripping qualities with said web. The said actuating rolls are in turn actuated through a system of mitre gearing by two solenoids oppositely mounted, in the core holes of which a plunger is longitudinally and movably mounted upon suitable V shaped rollers, said plunger being provided with spur gear teeth coacting with a spur gear on a shaft at right angles to said plunger. Secured to said spur gear and rotatively mounted on said shaft is an electromagnet. Secured to said shaft is a mitre gear to which is secured a disc shaped armature provided with two outwardly projecting teeth, said combination constituting a magnetic clutch. The said clutch when energized provides means for transmitting the plunger motion through the previously mentioned system of mitre gearing to the actuating rolls. Said plunger is also provided with suitable stops and shock absorbers for keeping the movement of same within predetermined limits.

Said plunger is further provided with upwardly projecting pins, which previous to the termination of the plunger movement strike the heads of adjusting screws in swingably mounted angle pieces, provided at one end with insulated contact points coacting with insulated stationary contact points. The purpose of said arrangement is to break the circuit in the clutch magnet thereby preventing the pull due to the plunger from acting detrimentally on the entire actuating roll, actuating mechanism, as will be understood as the description progresses. Since said plunger is actuated magnetically in one direction by each solenoid, springs with auxiliary mechanism capable of fine adjustment are provided for the return of same to its initial position. Since as before stated a railway car is subject to jerks, jolts and swaying motion, provision is made for locking said plunger when not in motion, said locking arrangement consisting of two arms pivotally mounted, one end of each of said arms opposing an outwardly projecting tooth of the beforementioned disc armature. The opposite end of each of said arms being spaced over the poles of electromagnets.

Current for energizing said magnets passes through a pair of insulated contact points, one of said contact points being provided in a swingable arm, said arm being further provided with a small roller, said roller operating in a recess of the previously mentioned plunger. It is obvious that when the plunger advances, the roller will rise out of the recess, thereby separating the contacts and breaking the circuit in the said magnet, permitting the arms to be drawn down by springs preparatory to the required locking of the plunger as will be more fully explained later.

In carrying out the object of enabling passengers to know the name of the station at which the train is at rest in addition to indicating the name of the next station before the train has left the said station at which it is at rest, I employ two shutters arranged for vertical movement by means of arms and links, said movement being derived from an independent solenoid and plunger for each shutter. Each of said shutters when in one of its extreme positions is located rearward of one of two glass windows in the front side of the indicator through which the inscriptions on the previously mentioned web are viewed. It is obvious that with the shutters located between the beforementioned windows and web view of the inscriptions on said web will be obstructed. An electro-magnetically controlled latch is provided for holding the shutters in the obstructed view position the required time.

A further provision in carrying out the object is accomplished by two small glass windows on either side of the previously mentioned glass windows, said small windows being of opaque glass having thereon suitable inscriptions, said inscriptions being instructive of the next or present station, said inscriptions being visible to passengers only when an electric lamp in a compartment rearward of each of said windows is illuminated, said lamps being controlled by the movement of the previously mentioned shutters, said lamps being illuminated when shutters are in a position permitting view of the inscriptions on the previously mentioned web. In order that the present object may be carried out for the web movement in either direction, a distributing device is provided, thereby assigning the current to lamps in the proper window compartments relative to the direction in which the train is moving as will be better understood from a more detailed description.

Having thus briefly described my invention I will now refer to the drawings.

Fig. 7 is a side view of the magnetic clutch on the line 7—7 of Fig. 2.

Fig. 8 is a longitudinal central sectional view of the essential parts of the magnetic clutch of Fig. 7 taken on the line 8—8 of Fig. 2.

Fig. 9 is a side view of the spring lead of the magnetic clutch of Fig. 7.

Fig. 10 is a transverse cross sectional view of the actuating rolls.

Fig. 11 is a fragmentary face view of the web.

Fig. 12 is a horizontal sectional view taken on the line 12—12 of Fig. 4.

Fig. 13 is four front views of the device showing various station positions.

Fig. 14 is a horizontal sectional view taken on the line 14—14 of Fig. 4.

Fig. 15 is a schematic wiring diagram of the device.

Fig. 16 is a fragmentary horizontal sectional view taken on the line 16—16 of Fig. 4.

Figure 1:
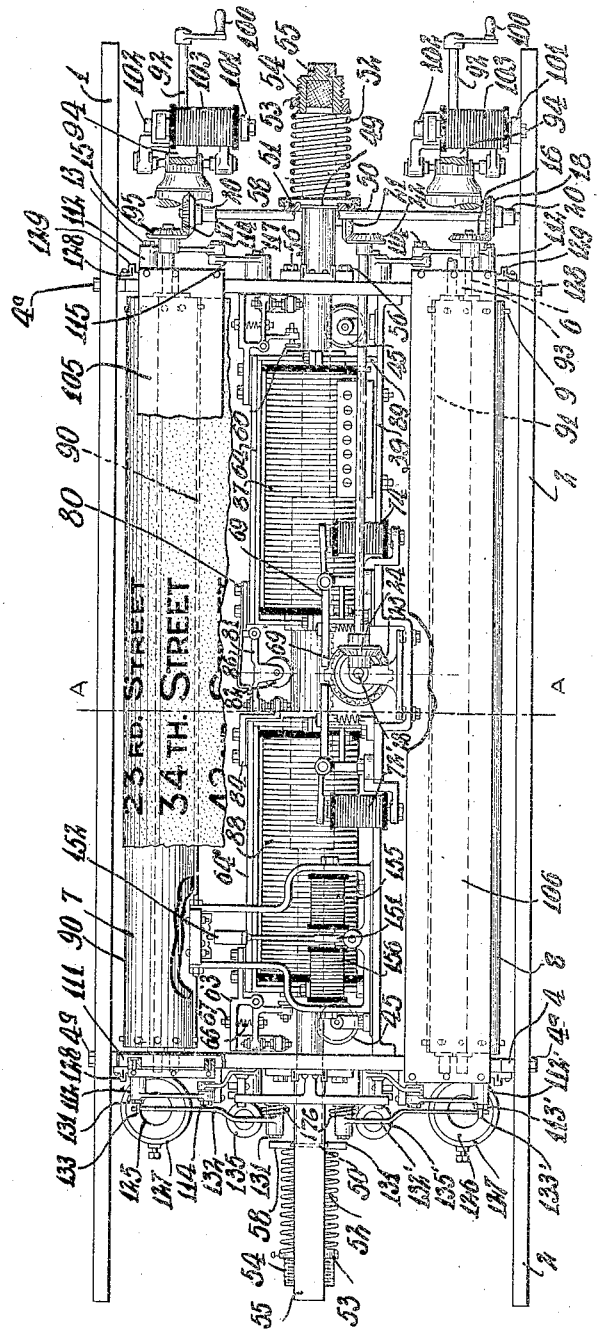
Fig. 1 is a front view of the entire machine with the casing removed.
Figure 2:
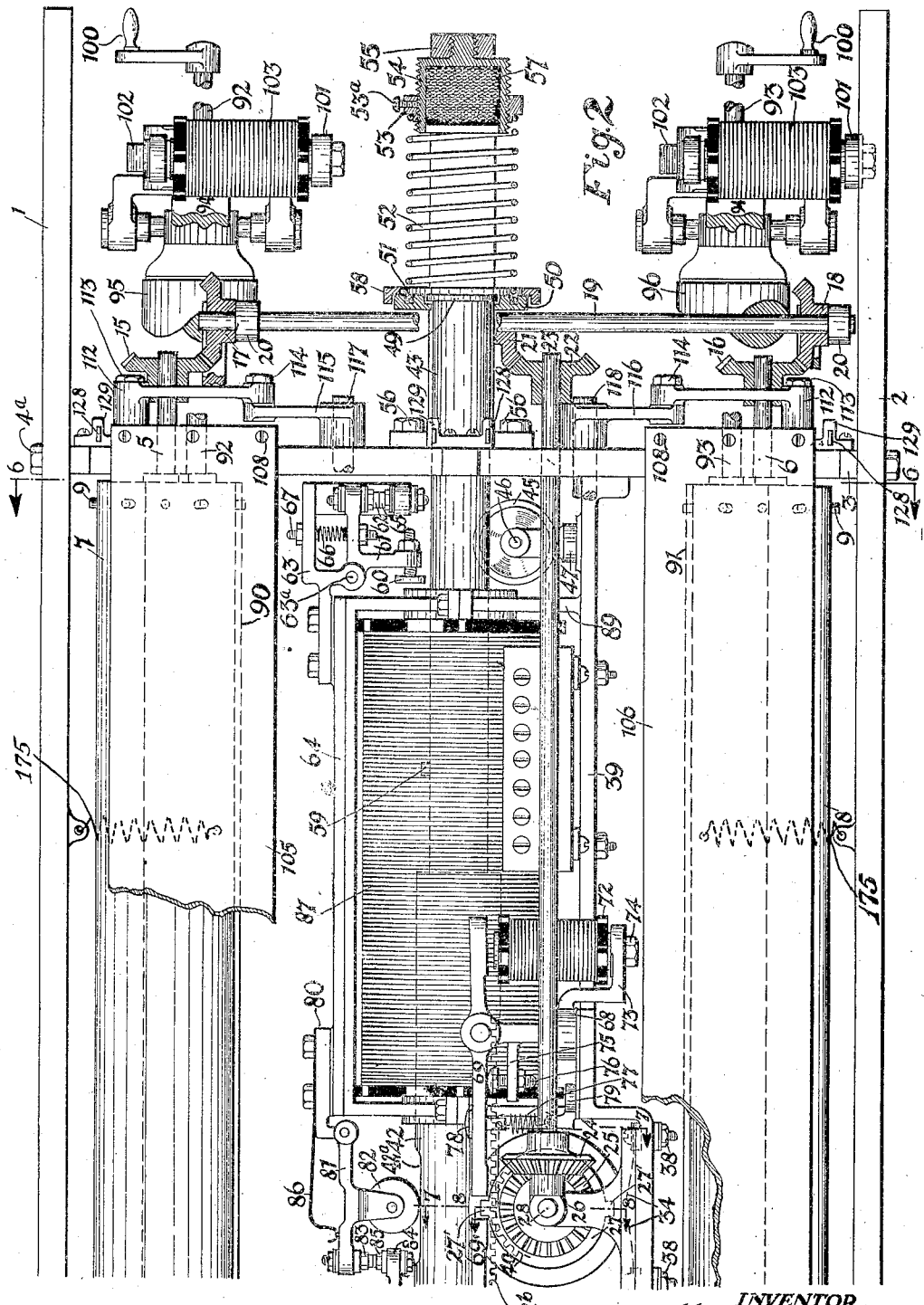
Fig. 2 is an enlarged view of Fig. 1 to the right of the line A—A certain parts being broken away and others shown in section to clearly illustrate the device.
Figure 3:
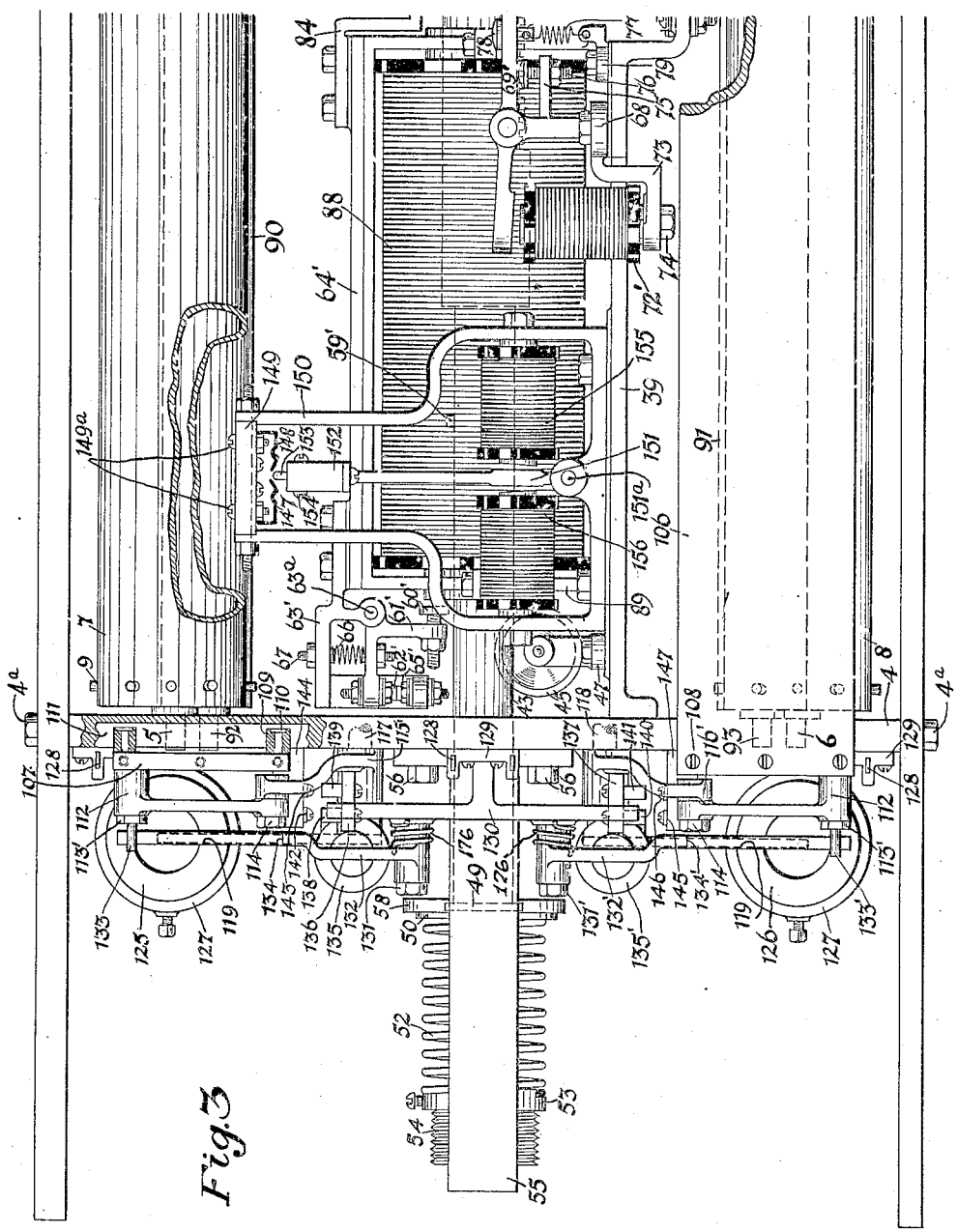
Fig. 3 is an enlarged view of Fig. 1 to the left of the line A—A certain parts being shown in section.
Figure 4:
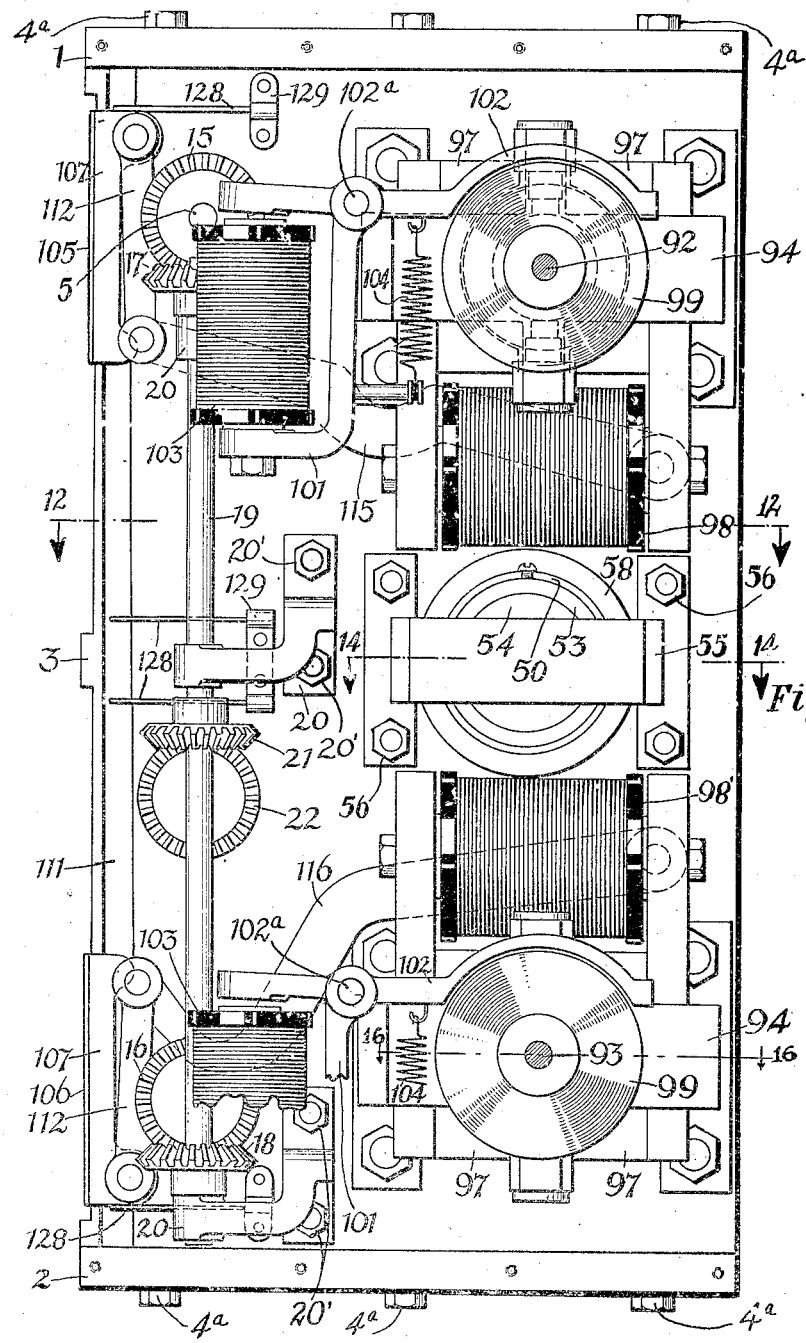
Fig. 4 is a right side view, certain parts being broken away to clearly illustrate the device.
Figure 5:
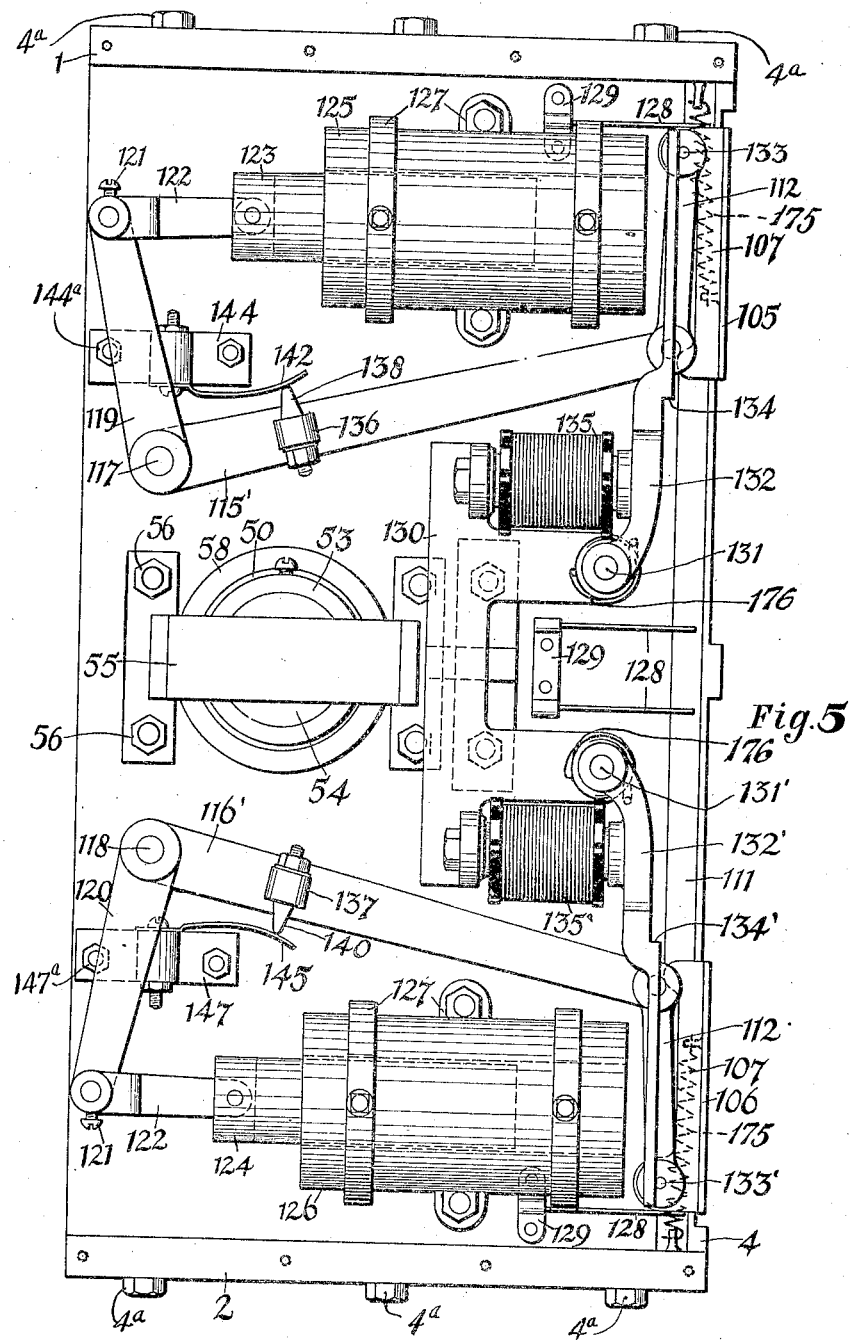
Fig. 5 is a left side view.
Figure 6:
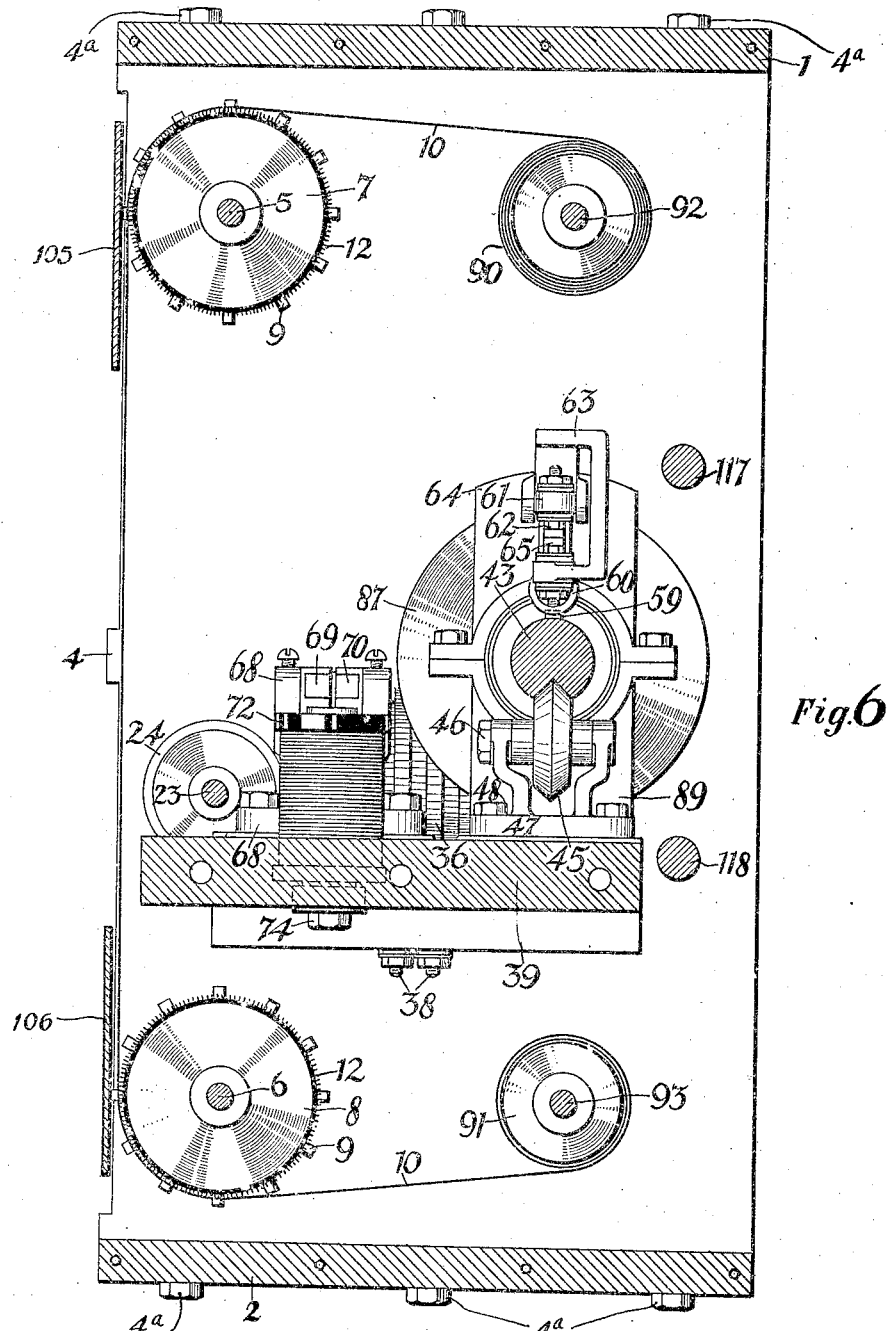
Fig. 6 is a vertical sectional view taken on the line 6—6 of Fig. 2.

The reference numeral 1 indicates the top, 2 the bottom, 3 the right hand side, and 4 the left hand side frame members, secured together by screws 4$^a$. Sheet metal plates 4$^b$ are secured to the frame members forming an enclosing casing. An upper stub shaft 5 and a lower stub shaft 6 are journaled in the frame members 3 and 4.

The stub shafts support the web actuating rolls 7 and 8 which are provided with a plurality of pegs or teeth 9 for coacting with perforations in the web 10, said perforations being reinforced by eyelets 11. Rolls 7 and 8 are outwardly covered with a friction surface 12 such as roughened rubber, sanded cloth or knurling for the purpose of affording good frictional contact between the web and said surface as previously briefly described. It is obvious that the ideal gripping qualities of the friction surface with the web will distribute the drawing strains over the entire width of the web instead of relying upon the pegs 9 for accomplishing the same result which would be detrimental to the eyelets of the web. The pegs 9 only prevent the web from shifting on the rolls 7 and 8 thereby always preserving the proper position of the inscriptions on the web relative to the windows 13—14 in the front plate 4$^b$ Fig. 13.

Secured to stub shafts 5 and 6 are mitre gears 15 and 16 meshing with gears 17 and 18 secured to the vertical shaft 19 rotatively supported in the bracket bearings 20, secured by screws 20' to the frame wall 3. Secured to the vertical shaft 19 is the mitre gear 21, meshing with the mitre gear 22 on a horizontal shaft 23, journaled in the frame 3 and the bearing 26 which is supported by bracket 39 secured to frame members 3 and 4. The shaft 23 is provided with a mitre gear 24 meshing with another mitre gear 25 secured to a disc shaped steel armature 27 (Fig. 7) provided with two outwardly protruding teeth 27' and firmly secured to shaft 28 rotatively mounted in the bearings 26. On the shaft 28 is unsecuredly mounted and free to rotate an electro-magnet 29 containing a winding 30. The leads of said winding are brought out through the insulating bushing 31 and electrically contact to the pins 32 which pass through eyes 33 of the spring leads 34 which are housed in the annular grooves 35 of the insulator 36, secured to the magnet shell by screws 37. Spring leads 34 are connected to binding screws 38 which are insulated in the bracket 39. To the electro-magnet 29 is secured a spur gear 40 by means of pins 41, the spur gear 40 meshing with the teeth 42$^b$ of plunger 42. In either end of the plunger 42 are forced brass bars 43, the underside of which are provided with V grooves 44 which rest on V rollers 45 supported rollably on the bearing pins 46 of the supports 47, secured to the bracket 39 by means of screws 48. At the extreme outward ends of said brass bars 43 discs 49 are secured which engage rings 50 having annular grooves 51 into which are welded or otherwise secured the end coil of springs 52, the opposite end of said springs being secured to internally threaded collars 53 provided with a set screw 53$^a$ said threaded collars being secured to outwardly threaded cups 54 held in the brackets 55 secured to the members 3 and 4 by means of screws 56. The hollow of the cups 54 contains soft rubber shock absorbers 57 for the purpose of absorbing the kinetic energy of the plunger when the motion of the same is suddenly arrested.

Integral with the brackets 55 are recessed rings 58 partly enveloping the rings 50. The rings 58 preventing the springs 52 and the rings 50 from drawing the plunger 42 beyond the required distance, as will be clearly understood from the drawings. By manipulating the threaded collars 53 on the threaded cups 54 and locking same against displacement by screw 53$^a$ the tension on the springs 52 may be increased or decreased over a wide range, thereby permitting the finest adjustment between the solenoid pull and the spring pull. This feature of the invention is of greatest importance especially where two or more indicators are to be operated on a single circuit, it being necessary that all the indicators respond to the same current strength in the plunger solenoids, so that each plunger may make its complete movement. Any deficiency such as too slow or too rapid response may therefore be compensated by the before mentioned manipulation of the adjusting collars 53.

In the bars 43 there are inserted upwardly projecting pins 59 and 59' which strike the adjustment screws 60 and 60' previous to the completion of the plunger movement. The said adjustment screws 60 and 60' are held in swingable angle pieces 61 and 61', one arm of these being provided with insulated contacts 62 and 62'. The swingable angle pieces 61 and 61' are supported on pins 63$^a$ held in the brackets 63 and 63' supported by brackets 64 and 64' connected to bracket 89 secured to bracket 39, the brackets 63—63' being provided with insulated contacts 65—65'. The contacts 62—65 and 62' and 65' are kept in firm contact by the springs 66, said springs being prevented from falling out by the headed screws 67 projecting slightly into the interior of the springs. The brackets 68 are supported to bracket 39 and have arms 69—69' and 70, 70' pivotally arranged therein, the arms 69, 69' opposing the teeth 27' of the disc armature 27 when the actuating mechanism is at rest.

The arms 70, 70' oppose the tooth 71 of the clutch magnet 29 when the plunger with its transmitting mechanism is at rest. The outward ends of the arms 69, 69' and 70, 70' are spaced above the poles of the electro-magnets 72, 72' supported on the downwardly projecting brackets 73 integral with the brackets 68 and being secured thereto by screws 74. Projecting from the brackets 68 are arms 75 threaded to receive adjusting screws 76, said adjusting screws 76 being for the purpose of preventing the arms 69, 69' and 70, 70' from dragging on the periphery of the disc armature 27 and the clutch magnet 29, thereby eliminating wear and wasteful resistance due to friction. The said arm 69, 69' and 70, 70' are held downwardly against adjustment screws 76 by means of springs 77, the looped ends of which pass through holes in the headed pins 78 which in turn pass through holes in the arms 69, 69' and 70, 70'. The lower ends of the springs 77 pass through holes in the brackets 79 secured to the bracket 39. To the bracket 64 is secured a bracket 80 to which is hinged an arm 81 provided with a roll 82 operating in a recess 42ª of the plunger 42. The extremity of said arm 81 is provided with an insulated contact point 83. Secured to the bracket 64' is a bracket 84 provided with an insulated contact 85. The contact points 83 and 85 are kept in firm contact by the spring 86. The plunger solenoids 87 and 88 are supported by upwardly projecting brackets 89 of the bracket 39. Current that energizes the electro-magnets 72, 72' passes through the contacts 83 and 85 (Fig. 15). It is obvious that when the plunger 42 advances, the roll 82 will rise out of the recess 42ª of said plunger 42 thereby separating the said contacts 83 and 85 and deenergizing the magnets 72, 72' and permitting the arms 69, 69' and 70, 70' to fall upon the adjusting screws 76 thereby locking the tooth 27' of the disc armature 27. Current that energizes the clutch magnet 29 passes through the contacts 62 and 65 and 62' and 65'. When the plunger is near the extremity of its travel, the pin 59 or 59' strikes the adjusting screw 60 or 60' separating the contacts 62 and 65 or 62' and 65' (depending upon which of the plunger solenoids are energized), thereby deenergizing the clutch magnet before the plunger has completed its movement. By carefully adjusting the screws 60, 60', the clutch magnet may be made to release its armature at such a point that the teeth 27' and 71 will move into position between the arms 69 and 69' and 70 and 70' without shock to said arms.

Describing the operation of a web movement due to the solenoids 87 or 88 the plunger 42 and actuating mechanism, let it be assumed that the solenoid 88 is energized. Simultaneously current passes through the contact points 83, 85, to the electro-magnet 72', energizing same and attracting the armatures of the arms 69' and 70' thereby elevating the ends of said arms 69', 70' and permitting the tooth 27' of the disc armature 27 to pass. Current also passes through the contact points 62, 65 and 62', 65' which are in series with the clutch magnet 29, which attracts the disc armature 27 thereby affording means for transmitting the plunger movement to the actuating rolls. The electro-magnets 72 and 72' and 29 are of the type quick acting while the solenoids 87, 88 are of the slow acting type, said slow action being due to the type of winding employed, said winding being such as to produce enormous inductive reactance, said inductive reactance opposing the energizing current from quickly rising to its maximum value, thereby causing slow plunger movement, therefore the former attract their armatures before any motion of the plunger 42 takes place. The plunger now moves farther into the core hole of the solenoid, the roll 82 rising out of the recess of said plunger, when said plunger has completed about one-half of its movement, thereby separating the contacts 83, 85, and deenergizing the magnet 72' and permitting the arms 69', 70' to fall on the adjusting screw 76. As the plunger advances still farther the succeeding tooth 27' raises the arm 69 and strikes the end of the arm 69' whereupon arm 69 again falls upon the head of the adjusting screw 76 thereby locking the tooth 27' of the disc armature 27 between the ends of the arms 69, 69'. The tooth 71 of the clutch magnet 29 raises the arm 70 and strikes the end of the arm 70' whereupon arm 70 again falls upon the head of the adjusting screw 76 thereby locking the tooth 71 between the arms 70, 70' and securing the clutch magnet and plunger against unnecessary movement. Before the plunger has completed its movement, the pin 59' strikes the screw 60' thereby separating the contacts 62', 65' and deenergizing the clutch magnet 29, thereby releasing the armature 27. The adjusting screws 60, 60' can be so adjusted that the clutch magnet circuit will be broken thereby releasing the disc armature 27 before the teeth 27' strike against the arms 69 and 69' as previously described.

It should be noted here that a web actuation requires 180° rotation of the disc armature 27. The various movements are, of course, designed and proportioned to meet this end. The plunger movement is transmitted to the actuating rolls by means of the spur gear teeth on the underside of said plunger coacting with the gear 40 secured to the clutch magnet 29 which attracts the armature 27 to which the gear 25 is secured, meshing with gear 24, said gear 24 being secured to the horizontal shaft 23 to which is also secured the gear 22 meshing with gear 21 on the vertical shaft 19 to which is secured the gears 17 and 18 meshing with gears 15 and 16, said gears being secured to the actuating roll stub shafts 5 and 6.

The return of the plunger is accomplished by the spring 52 secured to the ring 50. As the plunger advances the disc 49 engages the ring 50 thereby extending the spring 52. When the circuit of the solenoid 88 is broken, the plunger and the magnetic clutch 29 are returned to the initial position, said plunger and magnetic clutch being securely held by the tooth 71 between the arms 70, 70' against swaying motion of the car. Rearward of the rolls 7 and 8 are rolls 90 and 91, previously referred to as the supply rolls. These rolls are supported on stub shafts 92 and 93, journaled in the member 4 and the motor frames 94 which are secured to member 3. Mounted on the shafts 92 and 93 are motor armatures 95 and 96, rotatively mounted between pole pieces 97, said pole pieces being magnetized by the field magnets 98, 98'. To the aforementioned shafts 92 and 93 are secured friction discs 99. Shafts 92 and 93 are also provided with handles 100 for positioning the web by hand. Pivotally mounted at 102ª in the brackets 101 which are secured to the motor frames 94 are brake shoes 102. One end of said brake shoes acting as armatures for the electro-magnets 103, said electro-magnets being supported in the aforementioned brackets 101. The said brake shoes 102 are kept in frictional contact with the discs 99 by means of springs 104 during inactive periods.

When the web is moved into a new station position by means of the previously described actuating mechanism, the electro-magnets 103 are energized attracting the armatures of the brake-shoes 102, thereby permitting the winding and unwinding of the web due to the rotation of one of the motor armatures on the shafts 92 or 93. It should be clearly understood here that the rotation of the motor armatures 95 and 96 take no part in the movement of the web into new station positions, same being performed entirely by the solenoids 87 or 88 and the plunger 42 and auxiliary mechanism. The purpose of the motor armatures 95 and 96 is to rewind on one roll that which is paid out on the other roll. After the completion of a web movement the electro-magnets 103 are automatically de-energized, thereby permitting the brake-shoes 102 to be brought in contact with the friction discs 99 by means of the springs 104, thereby preventing the overrunning of the web and also preventing unwinding of the web from the supply rolls 90 and 91 due to the rocking and jolting of the car. Another feature of the motor winding arrangement is that it affords a means of bringing the web into ideal frictional contact with the friction surface 12 of the rolls 7 and 8, thus accomplishing the result of distributing the drawing strains over the entire width of web, rather than permitting the eyelets 11 and the pegs 9 to do same, this being accomplished in the following manner.

The motor armatures 95 and 96 mounted in their magnetic fields are of a type quick-acting. Current that energizes one of the plunger solenoids 87 or 88 for a web movement also energizes one of the motors on the shafts 92 or 93 (the particular solenoid and motor being energized depending upon the direction of web movement). Since the motors are of the quick-acting type and the plunger solenoids of the slow acting type, it is evident that the motor torque exerted on the web will bring said web into firm contact with the friction surface 12 of the rolls 7 and 8 before any rotation takes place due to the plunger 42 and the auxiliary actuating mechanism. The motor torque will also be exerted on the web for all positions of the plunger during its travel since said motors are capable of more rapid motion than the previously mentioned plunger. This feature is of utmost importance since it relieves the pegs 9, which coact with eyelets 11 in the web of the drawing, strains, which would be destructive to the web, said pegs 9 acting only to prevent the web from shifting on the actuating rolls 7 and 8 as previously described.

The shutters 105 and 106 which operate vertically, in grooves 111 of the frame walls 3 and 4 are secured to end pieces 107 by means of screws 108. The end pieces 107 are provided with rolls 109 mounted on pins 110. The rolls 109 are adapted to the vertical grooves 111 in the walls 3 and 4. Secured swingably to the said end pieces 107 by means of bearing screws 113 and 113' are links 112. Through the extremities of links 112 there passes bearing screws 114 permitting swingable movement of the links 112 but firmly securing them to the elevating arms 115 and 115' and 116 and 116', said arms being secured to horizontal shafts 117 and 118 journaled in the frame walls 3 and 4. Integral with arms 115' and 116' are right angular arms 119 and 120. Swingably secured to said right angular arms 119 and 120 by means of pins and set screws 121 are links 122 pivotally secured to plungers 123 and 124, said plungers being free to move in the core hole of the steel clad solenoids 125 and 126, supported in ring brackets 127. The aforesaid shutters 105 and 106 are kept in one of their extreme positions by means of springs 175. It is obvious therefore that when the steel clad solenoids 125 or 126 are energized, the plungers 123 or 124 will be drawn into the core hole, thereby moving the aforementioned shutters 105 and 106 into an extreme vertical position, thus affording means for obstructing the view of the inscriptions on the web through the windows 13 or 14 during periods when the car or train is between stations, the said shutters operating in a space rearward of said windows and forward of the web as previously described. The aforementioned shutters 105 and 106 are kept within proper working limits by means of limiting springs 128 held in the supports 129 and secured to the frame walls 3 and 4. Secured to the frame wall 4 is a bracket 130 and swingably secured to said bracket by means of bearing screws 131, are latches 132 and 132'. Said latches bear against pins 133 and 133' of the bearing screws 113' by means of springs 176, said latches are provided with notches 134 and 134'. Rearward of said latches 132 and 132' are electro-magnets 135 and 135' secured to the aforementioned bracket 130. When it is desired to obstruct the view of the inscriptions on the web 10 through the windows 13 or 14, the shutter 105 is lowered and the shutter 106 is raised by means of its actuating mechanism. In the raised or lowered positions of said shutters, the pins 133 and 133' come within the range of the notches 134 and 134'. Since as previously described the latches 132 and 132' bear against the pins 133 and 133' due to the action of springs 176, it is obvious that the notches 134 and 134' will engage the pins 133 and 133' when the shutter 105 is lowered or shutter 106 is raised, thereby holding same in said position.

When it is desired that the aforementioned shutters be released permitting view of the inscriptions on the web through the windows 13 and 14, the electro-magnets 135 or 135' are energized, thereby attracting the latches 132 or 132' thus releasing said shutters. It is to be pointed out here that one of the said shutters remains open during the entire course of travel in one direction, its companion shutter operating only at stations. When the direction of the car or train is reversed, the shutter which previously acted as the operating shutter assumes a stationary position, its companion shutter then becoming the actuating shutter. This will be more clearly understood by a complete description of the operation of the entire machine.

Secured to the arms 115' and 116' are fibre blocks 136 and 137 respectively. Secured to the insulator block 136 are contacts 138 and 139. Secured to the insulator block 137 are contacts 140 and 141. Directly above contacts 138 and 139 are spring contacts 142 and 143 fastened to the insulator block 144, said block being secured to the frame wall 4 by screws 144ª. Directly beneath the contacts 140 and 141 are spring contacts 145 and 146 fastened to the insulator block 149, said block being secured to the frame wall 4 by screws 147ª. Spring contacts 147 and 148 are secured by means of screws 147ª to an insulator block 149, same being held in the frame 150 secured to bracket 39. Swingably and controllably at the base of said frame 150 is a vertically positioned armature 151 pivoted at 151ª, the uppermost end of said armature being provided with an insulator block 152, said insulator block being provided with a contact 153, secured by means of screws 154, said screws also serving as means for making wire connections. The spring contact 148 is wired to the contacts 138 and 140 (Fig. 15) whilst the spring contact 142 is wired to a lamp in a compartment rearward of the window A. The spring contact 145 is wired to a lamp in a compartment rearward of the window D. It is to be noted here that the circuit making and breaking contacts as now being described are in series connection with said lamps, one conductor of each circuit therefor being connected from the main binding post 157 (Fig. 15) to the terminal of each lamp. It is also to be recalled that the windows here being mentioned are of an opaque glass, having thereon inscriptions, said inscriptions being visible only when illuminated by a lamp to the rearward of same as has already been fully described.

The spring contact 147 is wired to contacts 139 and 141 whilst the spring contact 146 is wired to a lamp in a compartment rearward of the window B. The spring contact 143 is wired to a lamp rearward of the window C. The electro-magnet 155 secured to the frame 150 is in circuit with the solenoid 87. The electro-magnet 156 secured to the aforementioned frame 150 is in circuit with the solenoid 88. The said electro-magnets 155 and 156 with armature 151 and contacts 147—148 and 153 act as a distributor for the lamps in the compartments A, B, C, and D in conjunction with the contacts on the arms 115' and 116' and the insulator blocks 144 and 147, as will be evident from an inspection of the wiring diagram of Fig. 15.

Describing the operation of illuminating the lamps in the compartments rearward of the windows A, B, C, and D relative to the direction of travel and also the position of the train along the route of said travel, let it be assumed that the shutter 105 is in an upward position, permitting passengers to see the inscription on the web through the window 13. The shutter 106 is now in a raised position concealing view of the inscription on the web, rearward of the window 14. The contacts 140, 141 and 145, 146 are now separated since the arm 116' which actuates the shutter 106 is also raised. Current therefore cannot pass to the lamps of the compartments B or D, regardless of the position of the armature 151.

Let it also be assumed that the armature 151 is biased to the right thus affording contact between 153 and the spring contact 148. Contact 153 is threaded to receive the screw 154 said screw being wired to the binding post 158, Fig. 15. Since as stated the shutter 105 is in a raised position, the shutter actuating arm 115' is also in a raised position, thereby bringing the contacts 138 and 139 to bear against the spring contacts 142 and 143. Current will therefore pass from the binding post 158 through the wire 160, the contact 153, the spring contact 148 to the contact 138 to the spring contact 142 through the wire 161, thereby illuminating the lamp in the compartment A, making visible the words Next Station. The indicator would then appear as at E, Fig. 13. The device in this condition may indicate that the train is going downtown and is between stations. When the train or car arrives at a station, the conductor operates a switch which energizes the solenoid 87 causing a web movement, also dropping the shutter 106, by means of its releasing mechanism and bringing the contacts 140 and 141 to bear against the spring contacts 145 and 146. Current then passes from the binding post 158 through the wire 160, the contact 153, the spring contact 148, the contact 140, the spring contact 145, through the wire 162, thereby illuminating the lamp in the compartment D, informing the passengers of the station at which the car is at rest. The indicator would then appear as at F, Fig. 13. The device in this condition may indicate that the train is going downtown and is at a station.

Although the contact 139 bears against the spring contact 143 (when the contact 138 bears against the contact 142) which controls current in the lamp in the compartment rearward of the window C, current cannot pass through same because contact 153 is not engaged with spring contact 147, which in turn permits current to pass through said contacts 139 and 143. This also applies for the contacts on the arm 116'. However, when the solenoid 88 is energized causing a web movement in a reverse direction, the electro-magnet 156 is energized attracting the armature 151 to the left, contact 153 then engages spring contact 147 permitting current to pass through the contacts 139 to 143 to the lamp of compartment C and through the contacts 141 to 146 to the lamp of compartment B. current passing through said contacts only when the shutters are in a position permitting view of the inscriptions on the web. The indicator as appearing at G in Fig. 13 may indicate that the train is going uptown and is between stations, while as appearing at H, may indicate that the train is going uptown and is at a station.

Having thus described the construction, arrangement, and operation of the various units and parts, I will now describe the operation of said various units, and parts in combination. Let it be assumed as heretofore mentioned that the train is bound downtown. Let it be further assumed that the shutter 105 is elevated permitting the inscription on the web to be visible through the window 13. With the shutter in this position the lamp in the compartment of window A will be illuminated, thereby rendering the inscription on said window visible. The indicator will then appear as at E, Fig. 13. When the car or train arrives at a station, the conductor or motorman operates the switch 159. Current then simultaneously energizes the clutch magnet 29, the stop arm magnet 72, the brake magnets 103, the field magnet 98', the armature 96, the distributor magnet 155, the latch magnet 135' and the solenoid 87. The stop arms 70 and 69' are raised by the magnet 72 thereby releasing the tooth 27' while the clutch magnet attracts the disc armature 27. The plunger now moves into the core hole of the solenoid 87 against the resistance of the spring 52, rotating the actuating rolls through the system of mitre gearing. As the actuating rolls revolve, the motor armature 96 revolves the roll 91 thereby winding up the web that was drawn off the roll 90. The brake shoes are released from the friction wheels 99 by the electro-magnets 103 thereby permitting the said rolls 90, 91 freedom to revolve. The latch magnet 135' releases the latch 132' which holds the shutter 106 by means of the pin 133' in the notch 134', thereby permitting view of the inscription on the web through the window 14. By the lowered position of the shutter 106 and the arm 116', 140 contacts 145 and 138 contacts 142 and since the armature 151 is biased to the right due to the energized magnet 155, the lamp in the compartment D will be illuminated. The indicator would then appear as at F, Fig. 14.

The circuit of the clutch magnet is broken by the separation of the contacts 62, 65, by means of the pin 59 striking the screw 60. The circuit of the stop arm magnet 72 is broken by the separation of the contacts 83, 85 by means of the roll 82 rising by movement of the plunger 42. The circuit in the solenoid 87, the latch magnet 135', the distributor magnet 155, the motor armature 96 and the field magnet 98' is broken when the operator releases the switch 159. When the doors of the car or train are closed, the conductor or motorman operates the switch 163 which energizes the solenoid 126, thereby elevating the shutter 106 and obstructing view of the inscription on the web rearward of the window 14. The shutter is held in a raised position by means of the pin 133' engaging the notch 134'. The lamp in the compartment D will now be extinguished since the arm 116' is raised, thereby separating the contacts thereon. It is obvious therefore that the inscriptions on the windows A, B, C and D can be seen only when the shutters permit view of the web. When the direction of the train is reversed, reversed web and shutter movements are accomplished by the operation of switches 159' and 163'.

While I have herein described a particular and preferred construction and arrangement of parts, it is obvious that many structural and operative changes may be made without departing from the spirit of the invention. I therefore do not wish to be limited to the exact construction and arrangement as herein described and wish to reserve the right of making any and all changes that may fall within the scope of the invention as pointed out in the accompanying claims and it is further understood that portions of the invention may be used without others.

Having thus described my invention what I claim as new and desire to secure by United States Letters Patent is as follows:

1. A station indicator comprising a frame, web supply rolls mounted therein, a casing having compartments arranged therein covering the frame, provided with windows for viewing portions of the web, and opaque information glasses covering said compartments arranged in the casing, lamps arranged within the compartments, web actuating rolls mounted in the frame, a system of gears connected with the actuating rolls, solenoids with a common plunger connected for rotating the actuating rolls through the system of gears, a magnetic clutch interposed between the said common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

2. A station indicator comprising a frame, web supply rolls mounted therein, a casing having compartments arranged therein covering the frame provided with windows for viewing portions of the web, and opaque information glasses covering said compartments arranged in the casing, lamps arranged within the compartments, web actuating rolls mounted in the frame and provided with projecting pegs engaging perforations in the web, a system of gears connected with the actuating rolls, solenoids with a common plunger connected for rotating the actuating rolls through the system of gears, a magnetic clutch interposed between the said common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged, alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

3. A station indicator comprising a frame, web supply rolls mounted therein, a casing having compartments arranged therein covering the frame provided with windows for viewing portions of the web, and opaque information glasses covering said compartments arranged in the casing, lamps arranged within the compartments, web actuating rolls mounted in the frame and provided with projecting pegs engaging perforations in the web, and with a friction surface, a system of gears connected with the actuating rolls, solenoids with a common plunger connected for rotating the actuating rolls through the system of gears, a magnetic clutch interposed between the said common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged, alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

4. A station indicator comprising a frame, web supply rolls mounted therein, a casing having compartments arranged therein covering the frame provided with windows for viewing portions of the web, and opaque information glasses covering said compartments arranged in the casing, lamps arranged within the compartments, web actuating rolls mounted in the frame and provided with projecting pegs engaging perforations in the web, and with a friction surface, a system of gears connected with the actuating rolls, solenoids with a common plunger connected for rotating the actuating rolls through the system of gears, means for keeping the movement of the common plunger within predetermined limits, a magnetic clutch interposed between the said common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged, alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

5. A station indicator comprising a frame, web supply rolls mounted therein, a casing having compartments arranged therein covering the frame provided with windows for viewing portions of the web, and opaque information glasses covering said compartments arranged in the casing, lamps arranged within the compartments, web actuating rolls mounted in the frame and provided with projecting pegs engaging perforations in the web, and with a friction surface, a system of gears connected with the actuating rolls, solenoids with a common plunger connected for rotating the actuating rolls through the system of gears, means for keeping the movement of the common plunger within predetermined limits, means for urging the common plunger into its normal position, a magnetic clutch interposed between the said common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

6. A station indicator comprising a frame, web supply rolls mounted therein, a casing having compartments arranged therein covering the frame provided with windows for viewing portions of the web, and opaque information glasses covering said compartments arranged in the casing, lamps arranged within the compartments, web actuating rolls mounted in the frame and provided with projecting pegs engaging perforations in the web, and with a friction surface, a system of gears connected with the actuating rolls, solenoids with a common plunger connected for rotating the actuating rolls through the system of gears, means for keeping the movement of the common plunger within predetermined limits, means for urging the common plunger into its normal position and means for normally locking the common plunger in its normal position, a magnetic clutch interposed between the common plunger and the gearing of the web actuating rolls, stop arms magnetically operated and connected to the system of gearing to stop the actuating rolls in certain positions, motor armatures connected with the supply rolls for winding the web on one roll as it is drawn off another, brake devices for normally holding the supply rolls against rotation, and brake magnets for releasing the rolls permitting rotation, shutters movably arranged alignable with the windows to form obstructions therefor, shutter magnets connected to operate the shutters, latches for locking the shutters in certain positions, latch magnets connected to release the shutters from said certain positions, and distributor magnets synchronized with the shutters and solenoids to operate the lamps in the compartments of the casing to illuminate the information glasses according to the positions of the shutters.

7. In a device of the class described, a frame, web supply rollers rearwardly mounted therein, web actuating rollers mounted in the forward part of the frame, web material wound on the supply rollers and guided over the actuating rollers, the actuating rollers having a friction surface, and provided with pegs engaging perforations in the web, means for operating the actuating rollers, electric motors connected to the web supply rollers, friction discs secured to the armature shafts of the motors, spring operated brake shoes urged into engagement with the friction discs, and electromagnets for releasing the shoes from the discs upon energization of the electric motors.

8. In a device of the class described, a frame, web supply rollers, web actuating rollers mounted in the frame, web material wound on the supply rollers and guided over the actuating rollers, the actuating rollers having a friction surface, and provided with pegs engaging perforations in the web, means for operating the actuating rollers, electric motors connected to the web supply rollers, friction discs secured to the armature shafts of the motors, spring operated brake shoes urged into engagement with the friction discs, and electromagnets for releasing the shoes from the discs upon energization of the electric motors whereby the motors when energized tension the web against the friction surface of the actuating rollers, and also wind the web upon one supply roller as it is given off from the other.

9. In a device of the class described, a frame, web supply rollers, web actuating rollers mounted in the frame, web material wound on the supply rollers and guided over the actuating rollers, the actuating rollers having a friction surface, and provided with pegs engaging perforations in the web, means for operating the actuating rollers, electric motors connected to the web supply rollers, friction discs secured to the armature shafts of the motors, brake shoes urged into engagement with the friction discs for normally holding the supply rollers from unwinding the web, and electromagnets for releasing the shoes from the discs upon energization of the electric motors whereby the motors when energized tension the web against the friction surface of the actuating rollers, and also wind the web upon one supply roller as it is given off from the other.

10. In a device of the class described, a frame, a pair of aligned and opposite-acting solenoids supported therein, the solenoids being provided with a common plunger, rods projecting from the ends of the plunger, and formed on the undersides with V-grooves, supported V-rollers engaging in the V-grooves, discs secured to the outer ends of the rods, rings engaged by the discs, and formed with annular grooves, coil springs having one of their ends secured in the annular grooves, internally threaded collars secured to the other ends of the springs, set screws engaged in the collars, outwardly threaded cups engaging the collars, brackets supporting the cups, said brackets being secured to the said frame, shock absorbers within the cups, and recessed rings integral with the brackets and partly enveloping the said rings, to prevent the springs from drawing the plunger beyond a certain required distance.

11. In a device of the class described, a frame, a pair of aligned and opposite-acting solenoids supported therein, the solenoids being provided with a common plunger, rods projecting from the ends of the plunger, means for slidably supporting the rods, discs secured to the outer ends of the rods, rings engaged by the discs and formed with annular grooves, coil springs having one of their ends secured in the annular grooves, internally threaded collars secured to the other ends of the springs, set screws engaged in the collars, outwardly threaded cups engaging the collars, the set screws being abutable against the cups, brackets supporting the cups, said brackets being secured to the said frame, shock absorbers within the cups, and recessed rings integral with the brackets and partly enveloping the said rings, to prevent the springs from drawing the plunger beyond a certain required distance.

12. In a device of the class described, a frame, a pair of aligned solenoids supported therein, the solenoids being provided with a common plunger, rods projecting from the ends of the plunger and formed on the undersides with V-grooves, supported V-rollers engaging in the V-grooves, discs secured to the outer ends of the rods, rings engaged by the discs and formed with annular grooves, coil springs having one of their ends welded in the annular grooves, internally threaded collars secured to the other ends of the springs, outwardly threaded cups engaging the collars, means for locking the collars to the cups, brackets supporting the cups, said brackets being secured to the said frame, shock absorbers within the cups, and recessed rings integral with the brackets and partly enveloping the said rings, preventing the springs from drawing the plunger beyond a certain required distance.

13. In a device of the class described, a frame, a pair of aligned and oppositely acting solenoids supported therein, the solenoids being provided with a common plunger, rack teeth formed on the plunger, a rotatably supported gear meshing with the teeth, an electro-magnet secured to the gear, a disc shaped armature coaxially and rotatably mounted relative to the electro-magnet, a gear secured to the disc-shaped armature, web actuating rollers mounted in the frame, and a system of gearing connected with the last mentioned gear, and to the actuating rolls.

14. In a device of the class described, a frame, a pair of aligned and oppositely acting solenoids supported therein the solenoids being provided with a common plunger, rack teeth formed on the plunger, a rotatably supported gear meshing with the teeth, an electro-magnet secured to the gear, a disc-shaped armature coaxially and rotatably mounted relative to the electro-magnet, a gear secured to the disc-shaped armature, web actuating rollers mounted in the frame, and a system of gearing connected with the last mentioned gear, and to the actuating rolls, the disc shaped armature being provided with outwardly projecting teeth, a pair of pivotally mounted arms urged by springs to normally engage one of the said teeth to lock the armature in certain positions, and electro-magnets capable of moving the arms so as to free the said disc armature.

15. A station indicator comprising a frame, web supply rolls mounted therein, a casing having compartments arranged therein covering the frame, provided with windows for viewing portions of the web, and with instructive glasses covering said compartments arranged in the casing, web actuating rolls mounted in the frame, a system of gears connected with the actuating rolls, solenoids with a common plunger connected for rotating the actuating rolls through the system of gears, shutters movably arranged, alignable with the windows to form obstructions therefor, contacts movably arranged with the shutters, a master control, lamps positioned in the said compartments, stationary contacts connected with said lamps, and engageable by the said first contacts upon operation of the said shutters, said first mentioned contacts being connected to the master control, controlling which of said lamps are to be lit, and the master control being connected with the solenoids having the common plunger for directing its operation.

16. In a device of the class described, a frame, web supply rolls mounted therein, a casing having compartments arranged therein covering the frame, provided with windows for viewing portions of the web, and opaque glass windows for instructive purposes covering said compartments arranged in the casing, lamps arranged within the compartments, shutters slidably arranged in the frame so as to be movable to form obstructions for the windows, bell cranks pivotally supported and connected to the shutters, solenoids arranged to move the bell cranks, stops secured to the frame to limit the travel of the shutters, latch arms pivotally mounted capable of locking the shutters in certain positions, electro-magnets to move the latch arms, contacts secured to the bell cranks, stationary contacts engageable therewith, and the said contacts being connected to operate the lamps in the compartments of the casing to light the information glasses according to the position of the shutter, substantially as shown and described.

17. In a device of the class described, a frame, web supply rolls mounted therein, a casing having compartments arranged therein covering the frame provided with windows for viewing portions of the web, and opaque information glasses covering said compartments arranged in the casing, lamps arranged within the compartments, shutters slidably arranged in the frame so as to be movable to form obstructions for the windows, bell cranks pivotally supported and connected to the shutters, solenoids arranged to move the bell cranks, latch arms pivotally mounted capable of locking the shutters in certain positions, electro-magnets to move the latch arms, contacts secured to the bell cranks, stationary contacts engageable therewith, and the said contacts being connected to operate the lamps in the compartments of the casing to light the information glasses according to the position of the shutter substantially as shown and described.

18. In a device of the class described, a frame, web supply rolls mounted therein, a casing having compartments arranged therein covering the frame, provided with windows for viewing portions of the web, and opaque information glasses covering said compartments arranged in the casing, lamps arranged within the compartments, a pair of aligned and oppositely acting solenoids supported in the frame and connected to move the web in one direction or in the opposite direction, shutters slidably arranged in the frame so as to be movable to form obstructions for the windows, bell cranks pivotally supported and connected to the shutters, solenoids arranged to move the bell cranks, stops secured to the frame to limit the travel of the shutters, latch arms pivotally mounted capable of locking the shutters in certain positions, electro-magnets to move the latch arms, contacts secured to the bell cranks, stationary contacts engageable therewith, and the said contacts being connected to operate the lamps in the compartments of the casing to light the information glasses according to the position of the shutter, a distributor arm operated by electro-magnets connected to the said oppositely acting solenoids, connected with the lights to operate them to illuminate the information glasses according to the web travel, substantially as shown and described.

19. In a device of the class described, a frame, web supply rolls mounted therein, a casing having compartments arranged therein covering the frame, provided with windows for viewing portions of the web, and information glasses covering said compartments arranged in the casing, lamps arranged within the compartments, a pair of aligned and oppositely acting solenoids supported in the frame, and connected to move the web in one direction or in the opposite direction, shutters slidably arranged in grooves in the frame, so as to be movable to form obstructions for the windows, bell cranks pivotally supported to the frame and connected to the shutters, solenoids arranged to move the bell cranks, stops secured to the frame to limit the travel of the shutters, latch arms pivotally mounted to the frame capable of locking the shutters in certain positions, electro-magnets to move the latch arms, contacts secured to the bell cranks, stationary contacts engageable therewith, and the said contacts being connected to operate the lamps in the compartments of the casing to light the information glasses according to the position of the shutter, a distributor arm operated by electromagnets connected to the said oppositely acting solenoids, connected with the lights to operate them to illuminate the information glasses according to the web travel substantially as shown and described.

20. In a device of the class described, a casing provided with windows for viewing portions of a web, shutters movably arranged forming obstructions for the said windows, compartments arranged within the casing, and adjacent the windows, opaque glass windows covering the fronts of the compartments, instructive means arranged on the opaque glass windows and being normally invisible, lamps in the compartments, contacts movably arranged with the shutters engageable with stationary contacts to light the said lamps in the said compartments upon movement of the shutters to illuminate the opaque glasses making the instructive means visible at desired times as related to the various positions of the shutters.

21. In a device of the class described, a plunger common to a pair of oppositely acting solenoids and formed with rack teeth for actuating a train of gears for web moving purposes, the plunger being supported by rods projecting from the ends thereof, said rods being formed with V-grooves engaged by rotatably supported V-rollers.

22. A station indicator comprising a frame, web supply rolls mounted therein, a casing having compartments arranged therein covering the frame provided with windows for viewing portions of the web, and with instructive glasses covering said compartments arranged in the casing, web actuating rolls mounted in the frame, a system of gears connected with the actuating rolls, including a magnetic clutch for transmitting motion between two gears of the said system upon energization, solenoids with a common plunger connected for rotating the actuating rolls through the system of gears, and the magnetic clutch, shutters movably arranged alignable with the windows to form obstructions therefor, contacts movably arranged with the shutters, a master control, lamps positioned in the said compartments, stationary contacts connected with said lamps, and engageable by the said contacts upon operation of the said shutters, said first mentioned contacts being connected to the master control controlling which of said lamps are to be lit and the master control being connected with the solenoids having the common plunger for directing its operation.

23. A station indicator comprising a frame, web supply rolls mounted therein, a casing having compartments arranged therein covering the frame provided with windows for viewing portions of the web, and with instructive glasses covering said compartments arranged in the casing, web actuating rolls mounted in the frame, a system of gears connected with the actuating rolls, including a magnetic clutch for transmitting motion between two gears of the said system upon energization, solenoids with a common plunger connected for rotating the actuating rolls through the system of gears and the magnetic clutch, magnetically controlled stop devices for limiting the plunger movement, and for locking the plunger in certain positions, shutters movably arranged alignable with the windows to form obstructions therefor, contacts movably arranged with the shutters, a master control, lamps positioned in the said compartments, stationary contacts connected with said lamps and engageable by the said contacts upon operation of the said shutters, said first mentioned contacts being connected to the master control controlling which of said lamps are to be lit, and the master control being connected with the solenoids having the common plunger for directing its operation.

24. In a device of the class described, a frame, a pair of aligned and oppositely acting solenoids supported therein, the solenoids being provided with a common plunger, rack teeth formed on the plunger, a rotatably supported gear meshing with the teeth, an electro-magnet secured to the gear, a disc-shaped armature coaxially and rotatably mounted relative to the electro-magnet, a gear secured to the disc-shaped armature, web actuating rolls mounted in the frame, and a system of gearing connected with the last mentioned gear, and to the actuating rolls, the disc shaped armature being provided with outwardly projecting teeth, a pair of pivotally mounted arms urged by springs to normally engage one of said teeth to lock the armature in certain positions, and electro-magnets capable of moving the arms so as to free the said disc armature, the first mentioned electro-magnet being also provided with a projecting tooth engageable by pivoted arms to normally lock the said plunger in certain positions, and these latter mentioned pivoted arms being movable by the same electro-magnets which move the first mentioned pivoted arms so as to allow the plunger to move.

In testimony whereof I have affixed my signature.

HARRY M. OCKO.